United States Patent
Kuriyama

(10) Patent No.: US 9,462,621 B2
(45) Date of Patent: Oct. 4, 2016

(54) MOBILE COMMUNICATION SYSTEM AND BAND CONTROL METHOD FOR FLEXIBLY ACCOMMODATING THE POSITIONAL BIAS OF RADIO TERMINALS

(75) Inventor: Masaki Kuriyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1519 days.

(21) Appl. No.: 12/920,918

(22) PCT Filed: Mar. 2, 2009

(86) PCT No.: PCT/JP2009/053807
§ 371 (c)(1),
(2), (4) Date: Sep. 3, 2010

(87) PCT Pub. No.: WO2009/113414
PCT Pub. Date: Sep. 17, 2009

(65) Prior Publication Data
US 2011/0013579 A1    Jan. 20, 2011

(30) Foreign Application Priority Data

Mar. 14, 2008  (JP) .................................. 2008-065839

(51) Int. Cl.
| | | |
|---|---|---|
| H04W 76/00 | (2009.01) | |
| H04W 76/02 | (2009.01) | |
| H04W 64/00 | (2009.01) | |
| H04W 28/08 | (2009.01) | |

(52) U.S. Cl.
CPC ........... *H04W 76/022* (2013.01); *H04W 28/08* (2013.01); *H04W 64/00* (2013.01)

(58) Field of Classification Search
None
See application file for complete search history.

(56) References Cited

U.S. PATENT DOCUMENTS

| | | | |
|---|---|---|---|
| 6,714,789 B1 | 3/2004 | Oh et al. | |
| 2002/0093976 A1* | 7/2002 | Razoumov et al. | 370/444 |
| 2003/0039233 A1* | 2/2003 | Satt et al. | 370/338 |
| 2004/0136393 A1 | 7/2004 | Riveiro Insua et al. | |
| 2005/0059404 A1* | 3/2005 | Bejerano et al. | 455/446 |
| 2005/0079855 A1* | 4/2005 | Jethi et al. | 455/403 |
| 2005/0260997 A1* | 11/2005 | Korale et al. | 455/452.2 |
| 2006/0083205 A1* | 4/2006 | Buddhikot et al. | 370/338 |
| 2006/0176806 A1 | 8/2006 | Yoshihara et al. | |
| 2007/0064731 A1* | 3/2007 | Mizutani et al. | 370/468 |

(Continued)

FOREIGN PATENT DOCUMENTS

| | | |
|---|---|---|
| CN | 1518803 A | 8/2004 |
| CN | 1754349 A | 3/2006 |
| CN | 1929361 A | 3/2007 |

(Continued)

OTHER PUBLICATIONS

Ghosh et al, Optimum cost location area planning for third generation mobiles, Jan. 23-25, 2005, pp. 363-367, Personal Wireless Communications, 2005. ICPWC 2005. 2005 IEEE International Conference on.*

(Continued)

*Primary Examiner* — Hassan Phillips
*Assistant Examiner* — Gautam Sharma

(57) ABSTRACT

The value of communication bands required for each transmission line between a line consolidation section that consolidates lines from a plurality of radio base stations and the radio base stations are calculated and assigned based on the distribution of a number of terminals that is based on positional information of each radio terminal.

11 Claims, 4 Drawing Sheets

(56) References Cited

U.S. PATENT DOCUMENTS

2007/0070938 A1* 3/2007 Hori et al. ............... 370/328
2008/0085707 A1* 4/2008 Fadell .................. 455/435.3

FOREIGN PATENT DOCUMENTS

| | | |
|---|---|---|
| CN | 101009866 A | 8/2007 |
| JP | 9-251302 A | 9/1997 |
| JP | 11-234729 A | 8/1999 |
| JP | 11-250134 A | 9/1999 |
| JP | 2000341742 A | 12/2000 |
| JP | 2001086056 A | 3/2001 |
| JP | 2002271386 A | 9/2002 |
| JP | 2004048435 A | 2/2004 |
| JP | 2005050152 A | 2/2005 |
| JP | 2005079740 A | 3/2005 |
| JP | 2005191688 A | 7/2005 |
| JP | 2005252988 A | 9/2005 |
| JP | 2006020240 A | 1/2006 |
| JP | 2008035366 A | 2/2008 |
| WO | 02082839 A | 10/2002 |
| WO | 2007/063546 A2 | 6/2007 |
| WO | 2007/133787 A2 | 11/2007 |

OTHER PUBLICATIONS

International Search Report issued in Japanese counterpart application PCT/JP2009/053807.
Chinese Office Action for CN20090108937.8 dated Oct. 31, 2012.
Chinese Office Action for CN Application No. 200980108937.8 issued on May 6, 2013 with English Translation.
The Extended European Search Report for EP Application No. 09719359.3 dated on Mar. 27, 2014.

* cited by examiner

MOBILE COMMUNICATION SYSTEM AND BAND CONTROL METHOD FOR FLEXIBLY ACCOMMODATING THE POSITIONAL BIAS OF RADIO TERMINALS

TECHNICAL FIELD

The present invention relates to a mobile communication system and to a band control method for the system.

BACKGROUND ART

In a mobile communication system, the arrangement of cells, the size of cells, and the communication band for each cell are typically designed based on the predicted number of users, the communication volume, or the propagation environment of radio waves to enable provision of communication service requested from each user without there being areas in which communication is not possible. At this time, communication bands between the radio base stations that manage cells and the apparatus for controlling the radio base stations are a fixed value that depends on the communication capability of each radio base station that is set in the system design beforehand.

In a mobile communication system, various information-providing services or the connection and disconnection of calls to radio terminals that are moving are typically controlled based on positional information of the radio terminals belonging to users. A method of registering positional information of radio terminals is disclosed in Japanese Laid-Open Patent Publication No. H11 (1999)-234729.

As described hereinabove, in a mobile communication system of the background art, the communication bands between radio base stations provided in each cell and the apparatus that controls the radio base stations are set beforehand by system design. As a result, when access to a radio base station from radio terminals surpasses the predictions made at the time of system design, the concern arises that users in corresponding cells will experience interruptions of communication service or be unable to communicate. Such states are preferably reduced to a minimum.

SUMMARY

It is therefore an object of the present invention to provide a mobile communication system and band control method that can solve the above-described problems.

The exemplary aspect of the mobile communication system of the present invention for achieving the above-described object includes: a radio base station that is able to communicate with a plurality of radio terminals; a multiplex transmission apparatus that consolidates lines from a plurality of the radio base stations; and a core network unit that calculates each communication band that is assigned for each transmission line between the radio base stations and the multiplex transmission apparatus based on positional information for each of the radio terminals; wherein the multiplex transmission apparatus and the radio base station transmit and receive information via a communication band for each of the radio base stations that is calculated by the core network unit.

The exemplary aspect of the band control method, based on positional information for each radio terminal, calculates and assigns communication bands that are necessary for each transmission line between radio base stations and a multiplex transmission apparatus that consolidates lines from a plurality of radio base stations, and thus establishes communication between the radio base stations and the multiplex transmission apparatus according to the calculated communication bands for each of the radio base stations.

EXEMPLARY EMBODIMENT

The present invention is next described using the accompanying figures.

Figure 1:
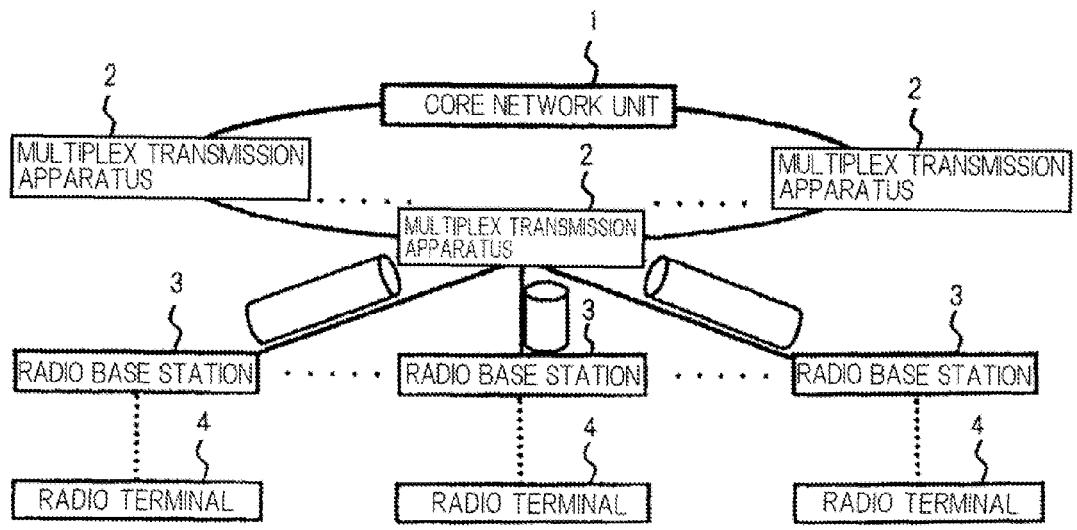
FIG. 1 is a block diagram showing an example of the configuration of a mobile communication system.
Figure 2:
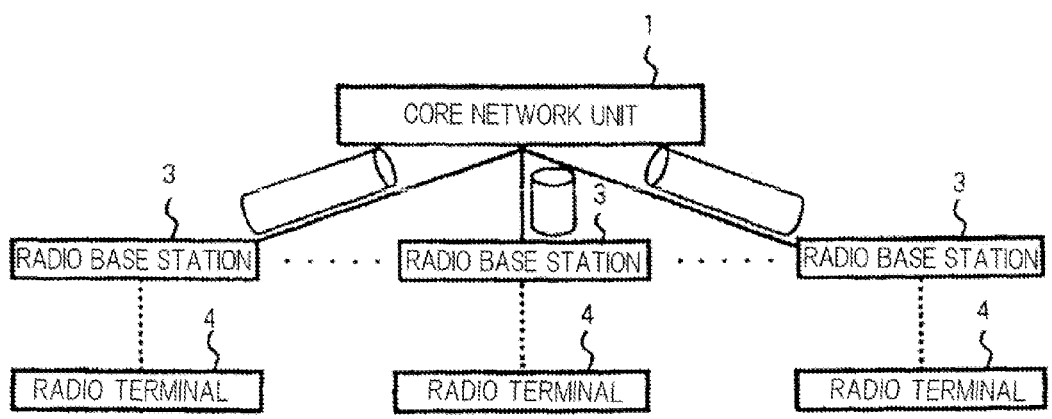
FIG. 2 is a block diagram showing another example of the configuration of a mobile communication system.

FIG. 1 is a block diagram showing an example of the configuration of a mobile communication system, and FIG. 2 is a block diagram showing another example of the configuration of a mobile communication system.

As shown in FIG. 1, the mobile communication system is provided with: core network unit 1, multiplex transmission apparatuses 2, radio base stations 3, and radio terminals 4.

Core network unit 1 is an apparatus that has jurisdiction over a network within a predetermined area, and for example, is provided with capabilities of controlling the connection or disconnection of calls for each radio terminal 4, registering the position of each radio terminal 4, and providing various communication services to radio terminal 4. Core network unit 1 shown in FIG. 1 is able to communicate with networks under the jurisdiction of other core network units by connecting with a higher-order network (not shown)

Multiplex transmission apparatuses 2 are connected to core network unit 1 by, for example, a transmission line (cable) in a ring form. Multiplex transmission apparatuses 2 both multiplex and transmit user data from radio terminals 4 to core network unit 1 and transmit data from core network unit 1 to radio terminals 4 by way of radio base stations 3 of cells within range.

Radio base stations 3 are, for example, connected to multiplex transmission apparatuses 2 by a transmission line (cable) in a star form. Radio base stations 3 are each capable of radio communication with a plurality of radio terminals 4 within the cells that are managed by the radio base stations.

Radio terminals 4 are terminal devices possessed by users who have a contract with the proprietary company that manages the mobile communication system shown in FIG. 1. Radio terminals 4 periodically transmit their own positional information.

The mobile communication system shown in FIG. 2 represents an example of a configuration in which a plurality of radio base stations 3 are connected to core network unit 1 and that lacks multiplex transmission apparatuses 2. In the configuration shown in FIG. 2, core network unit 1 is provided with the functions of multiplex transmission apparatuses 2 shown in FIG. 1.

The cylinders shown aligned with the lines that connect multiplex transmission apparatuses 2 shown in FIG. 1 (or core network unit 1 shown in FIG. 2) and radio base stations 3 are schematic representations of transmission lines and are the object of control in the present invention.

FIG. 1 shows an example of a configuration in which three multiplex transmission apparatuses 3 are connected to one core network unit 1, but the number of multiplex transmission apparatuses 2 is not limited to three and any number may be used. In FIGS. 1 and 2, configurations are shown in which three radio base stations 3 are connected to multiplex transmission apparatuses 2 or core network unit 1 and one radio terminal 4 is connected to each radio base station 3, but more radio base stations 3 can be connected to multiplex transmission apparatuses 2 and core network unit 1 and more radio terminals 4 can be connected to radio base stations 3.

Figure 3:
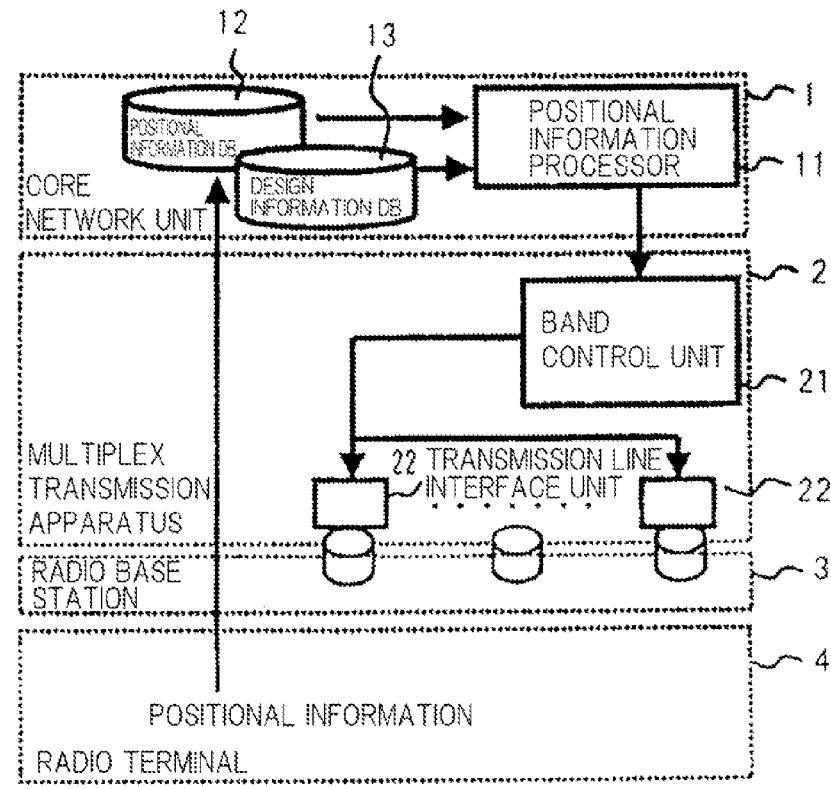
FIG. 3 is a block diagram showing an example of the configuration of each device provided in the mobile communication system shown in FIG. 1.
Figure 4:
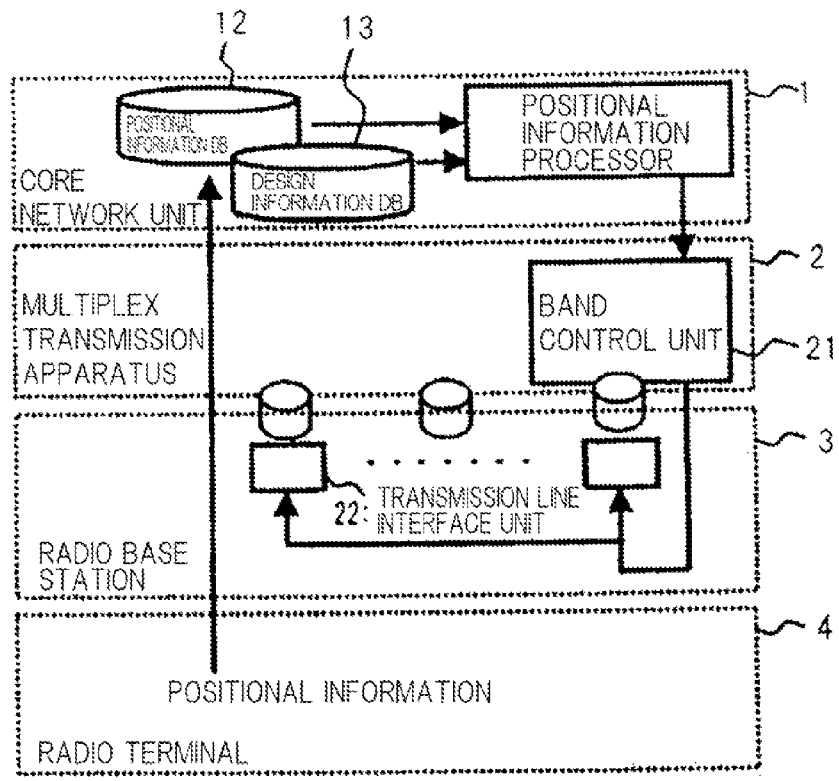
FIG. 4 is a block diagram showing another example of the configuration of each device provided in the mobile communication system shown in FIG. 1.

FIGS. 3 and 4 are block diagrams showing examples of the configuration of each of the devices provided to the mobile communication system shown in FIG. 1. FIG. 3 and FIG. 4 show only constituent elements that relate to the present invention. Anyone of ordinary skill in the art will be well acquainted with the configurations and their operations for realizing the basic functions of core network unit 1, multiplex transmission apparatus 2, radio base station 3, and radio terminal 4, and a detailed explanation of these configurations and operations is therefore here omitted.

As shown in FIG. 3, core network unit 1 is provided with: positional information database 12 in which positional information of each radio terminal 4 is registered, design information database 13 in which is registered system design information that includes information of the communication bands that can be used in multiplex transmission apparatus 2 (or core network unit 1), and positional information processor 11 that uses the information registered in positional information database 12 and design information database 13 to calculate the communication band that is assigned to each transmission line between multiplex transmission apparatus 2 (or core network unit 1) and radio base station 3.

Multiplex transmission apparatus 2 is provided with: band control unit 21 that controls the communication bands between multiplex transmission apparatus 2 (or core network unit 1) and each radio base station 3, and transmission line interface units 22 that are interfaces for transmitting and receiving information between each radio base station 3 and multiplex transmission apparatus 2 and that are provided for each transmission line. In addition to the configuration in which multiplex transmission apparatus 2 is provided with transmission line interface units 22 as shown in FIG. 3, a configuration can also be adopted in which radio base station 3 is provided with transmission line interface units 22 as shown in FIG. 4. The mobile communication system shown in FIG. 4 is the same configuration as the mobile communication system shown in FIG. 3 with the exception that transmission line interface units 22 are provided in radio base station 3.

Positional information processor 11 provided in core network unit 1 and band control unit 21 provided in multiplex transmission apparatus 2 can be realized by, for example, a CPU or DSP that executes a process in accordance with a program, or an LSI that is constituted by a logic circuit. Transmission line interface units 22 can be realized by logic circuits that include a known driver for transmitting and receiving information.

The band control method of the present invention is next described using the accompanying figures.

Figure 5:
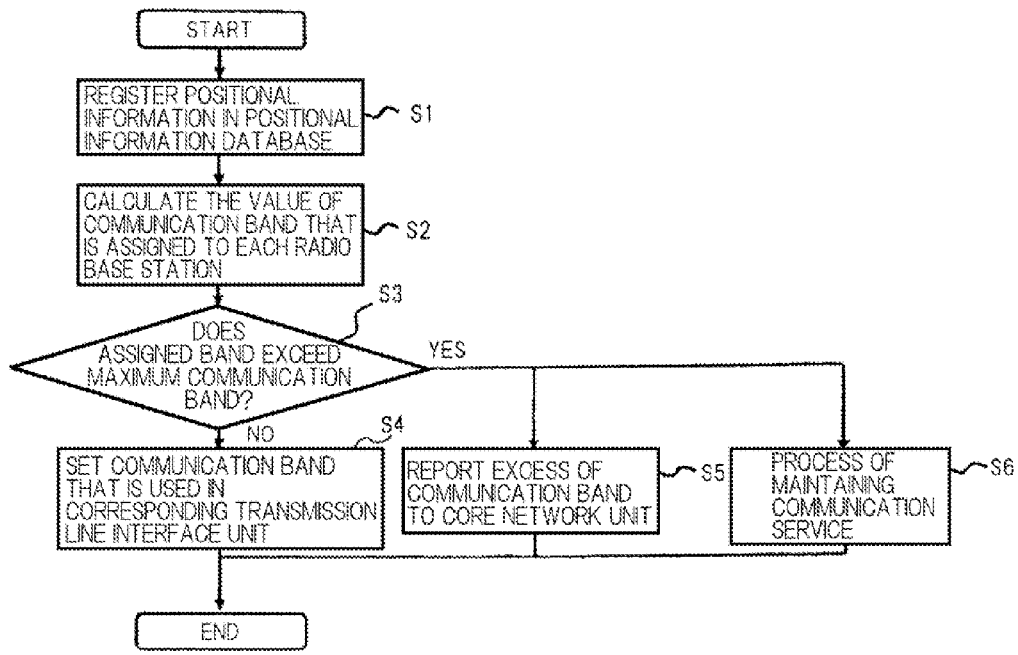
FIG. 5 is a flow chart showing the procedure of the band control method of the present invention.
Figure 6:
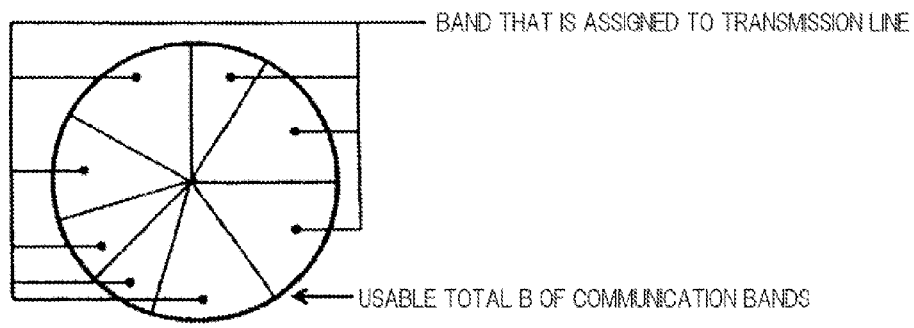
FIG. 6 is a schematic view showing the state of assigning a communication band to each transmission line according to the procedure shown in FIG. 5.

FIG. 5 is a flow chart showing the procedure of the band control method of the present invention, and FIG. 6 is a schematic view showing the state of assignment of communication bands to each transmission line according to the procedure shown in FIG. 5.

In the present exemplary embodiment, rather than a fixed value that is designed in advance such as in the background art, the communication band of each transmission line between multiplex transmission apparatus 2 (or core network unit 1) and radio base station 3 is assumed to be a band that, beyond ensuring a band sufficiently larger than the estimated design value, allows change of the band that is used.

In the following explanation, A is the communication band that is guaranteed to be available for use by each radio base station 3 that is connected to multiplex transmission apparatus 2 (or core network unit 1), B is the total of the communication bands that are used in multiplex transmission apparatus 2 (or core network unit 1) that is connected to radio base stations 3, and a case is here described in which A>B.

Core network unit 1 receives by way of radio base stations 3 and multiplex transmission apparatuses 2 positional information that is issued at each predetermined period (interval t1) from each radio terminal 4, and registers the positional information in positional information database 12 (Step S1). The positional information here described is in-cell information indicating radio base station 3 that manages the cell in which radio terminal 4 is located.

Core network unit 1 next uses positional information database 12 to find the distribution of the number of radio terminals 4 in the area under its own jurisdiction by means of positional information processor 11. Positional information processor 11 further, based on information of the number of radio base stations 3 (=the number of transmission lines) under the jurisdiction of one multiplex transmission apparatus 2 or core network unit 1 that is registered in design information database 13, the number of radio terminals of each of these radio base stations 3, and the communication bands that are guaranteed to be available for use in one multiplex transmission apparatus 2 (or core network unit 1), calculates the value of communication band that is assigned to each radio base station 3 for each predetermined period (interval t2 where t2>t1) (Step S2).

Methods that can be considered as the method of calculating communication bands that are assigned to radio base stations 3 include the following (1) to (3):

(1) Assigning the communication band that is assigned to each radio base station 3 according to the number of radio terminals 4 within the cell that is managed by radio base station 3.

(2) Assigning the communication band that is assigned to each radio base station 3 according to the number of radio terminals 4 with power supply ON that are in the cell managed by radio base station 3.

(3) Assigning the communication band that is assigned to each radio base station 3 according to the number of radio terminals 4 that are performing communication in the cell managed by radio base station 3.

Positional information processor 11, upon calculating the communication band that is assigned to each radio base station 3, reports the calculation results to band control unit 21 of each multiplex transmission apparatus 2.

Upon receiving the calculation results of the communication band that is assigned to each radio base station 3 from positional information processor 11, band control unit 21 determines whether the communication bands assigned to radio base stations 3 (assigned band) exceeds the maximum value of the communication band that can be used in radio base stations 3 (hereinbelow referred to as the maximum communication band) (Step S3).

If the assigned band does not exceed the maximum communication band of radio base stations 3, band control unit 21 sets the communication bands that are used in corresponding transmission line interface units 22 such that the desired communication bands are guaranteed for the transmission lines between multiplex transmission apparatus 2 and each radio base station 3 (Step S4). The state of assignment of communication bands to each radio base station 3 at this time is shown in FIG. 6. In FIG. 6, the total B of communication bands used in multiplex transmission apparatus 2 (or core network unit 1) is represented by a circle, and communication band B schematically represents the state of distribution to each radio base station (=transmission lines) that is connected to multiplex transmission apparatus 2.

When the assigned band exceeds the maximum communication band of radio base stations 3; band control unit 21 for example reports the excess of the communication band to core network unit 1 (Step S5). In such cases, communication service to radio terminals 4 that are in cells that have been notified of the excess of the communication bands is under some circumstances interrupted, but the proprietary company that manages the network preferably promptly increases the number of radio base stations 3 as needed.

Figure 7:
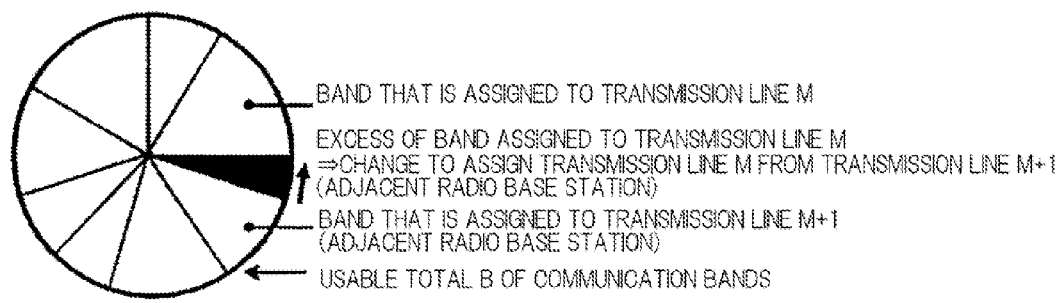
FIG. 7 is a schematic view showing the state of, by means of an adjacent cell, maintaining the excess portion of a communication band that exceeds the maximum communication band.

Alternatively, even when the assigned communication bands exceed the maximum communication band of radio base stations 3, if a particular radio terminal 4 is in a location that can communicate with an adjacent cell, core network unit 1 may divert a communication band to radio base station 3 that manages the adjacent cell in order to maintain the communication service communicate with radio terminal 4 (Step S6). An example of radio terminal 4 that can communicate with an adjacent cell is radio terminal 4 that is executing a known handover process. FIG. 7 shows the state of assignment of communication bands to each radio base station 3 at this time. In FIG. 7, a schematic representation is shown of a state in which the total B of communication bands used by multiplex transmission apparatus 2 (or core network unit 1) is represented by a circle and, of the communication band assigned to transmission line m (where m is a positive number), the amount that exceeds the maximum communication band of radio base station 3 is maintained by a communication band that was assigned to transmission line m+1 of radio base station 3 that manages the adjacent cell.

Figure 8:
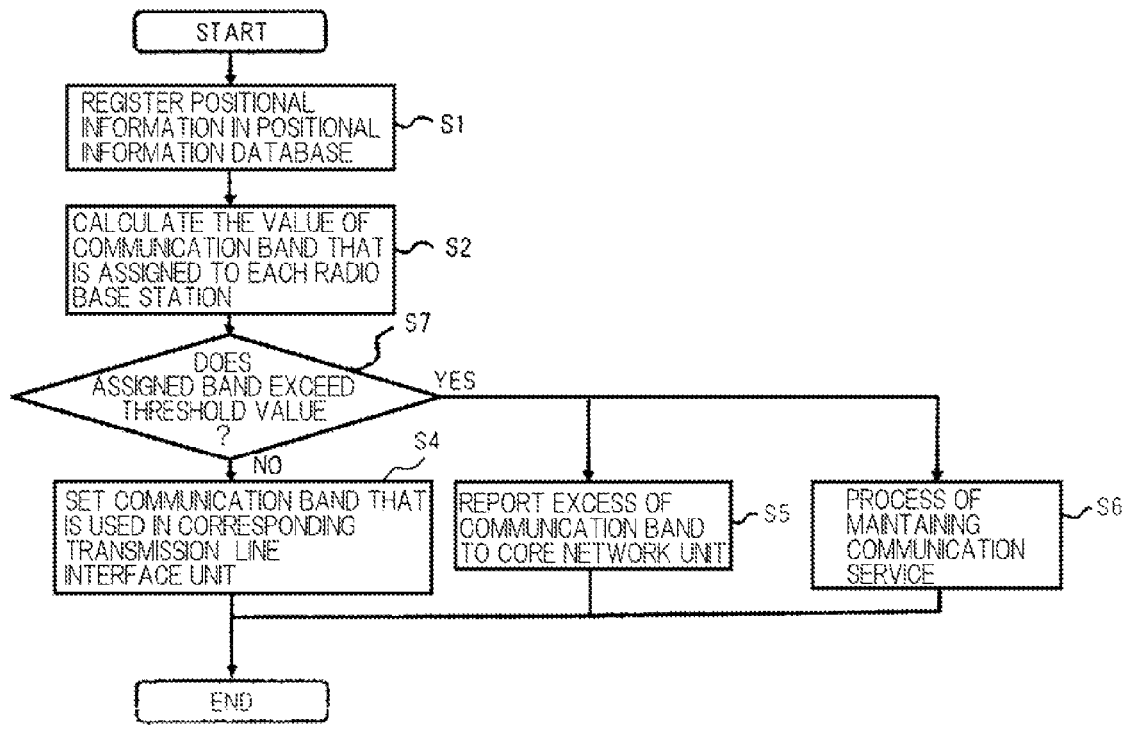
FIG. 8 is a flow chart showing another procedure of the band control method of the present invention.

Alternatively, as shown in FIG. 8, in place of the process of Step S3 shown in FIG. 5, band control unit 21 may be provided with a threshold value that is smaller than used band B and that is set in advance, and upon receiving the calculation results of the communication bands that are assigned to radio base stations 3 from positional information processor 11, band control unit 21 may judge whether an assigned communication band exceeds the threshold value (Step S7). In this case, core network unit 1, at the stage of receiving notification from band control unit 21 that the communication band has exceeded the threshold value, i.e., at the stage of forecasting that the assigned communication band will exceed the maximum communication band of radio base station 3, may execute a process of interrupting the communication service or a process of maintaining the communication service by means of an adjacent cell. Alternatively, the proprietary company that manages the network may increase the number of radio base stations 3. The processes of Steps S1-S2 and Steps S4-S6 shown in FIG. 8 are the same as the processes of Steps S1-S2 and Steps S4-S6 shown in FIG. 5, and explanation of these steps is therefore here omitted.

According to the present invention, the communication band of each transmission line between multiplex transmission apparatus 2 (or core network unit 1) and radio base stations 3 is changed according to the distribution of the number of radio terminals 4 in cells managed by each radio base station 3, and changes of communication bands that occur due to the positional bias of radio terminals 4 in the mobile communication system can therefore be flexibly accommodated. As a result, if the maximum communication band of each radio base station 3 is guaranteed by a value that is sufficiently greater than the number of radio terminals 4 or communication volume that is anticipated, and the communication band between each radio base station 3 and multiplex transmission apparatus 2 (or core network unit 1) can be secured despite localized access from radio terminals 4 that exceeds predictions.

In a mobile communication system of the background art, the communication band between each radio base station 3 and the above-described multiplex transmission apparatus 2 (or core network unit 1) was a fixed-value assignment, and the number of radio base stations 3 that could connect to multiplex transmission apparatus 2 (or core network unit 1) was therefore limited. In contrast, in the mobile communication system of the present exemplary embodiment, the number of radio base stations 3 that can connect to multiplex transmission apparatus 2 (or core network unit 1) is not limited by the above-described maximum value B of the communication band, and as long as adjacent cells can identify each other, more radio base stations 3 can connect to multiplex transmission apparatus 2 (or core network unit 1).

As a result, positional bias of radio terminals 4 can be flexibly accommodated in the mobile communication system of the present exemplary embodiment, and interruptions to communication service to radio terminals 4 or states of inability to communicate can therefore be decreased.

Still further, in the mobile communication system of the present exemplary embodiment, there is a high potential of the occurrence of an empty band (the difference between maximum communication band A that is guaranteed and communication band B that is used) in the transmission lines between radio base stations and multiplex transmission apparatus 2 (or core network unit 1). This enables a new business such as the lending empty bands to a Mobile Virtual Network Operator (MVNO).

Although the invention of the present application has been described with reference to an exemplary embodiment, the invention of the present application is not limited to the above-described exemplary embodiment. The configuration and details of the invention of the present application are open to modification within the scope of the invention of the present application that will be understood by one of ordinary skill in the art.

The present application is the National Phase of PCT/JP2009/053807, filed Mar. 2, 2009, which claims priority based on Japanese Patent Application No. 2008-065839, filed on Mar. 14, 2008, the disclosure of which is incorporated herein by reference in its entirety.

The invention claimed is:

1. A mobile communication system comprising:
a radio base station capable of radio communication with a plurality of radio terminals;
a multiplex transmission apparatus that consolidates lines from a plurality of said radio base stations; and
a core network unit that calculates the value of each communication band that is assigned for each transmission line between said radio base stations and said multiplex transmission apparatus based on positional information of each of said radio terminals;
wherein said multiplex transmission apparatus and said radio base station transmit and receive information by a communication band for each said radio base stations that is calculated by said core network unit.

2. The mobile communication system according to claim 1, wherein said core network unit calculates the value of each communication band that is assigned for each said transmission line according to the number of radio terminals in a cell managed by said radio base station.

3. The mobile communication system according to claim 1, wherein said core network unit calculates the value of each communication band that is assigned for each said transmission line according to the number of radio terminals having power supply ON in a cell managed by said radio base station.

4. The mobile communication system according to claim 1, wherein said core network unit calculates the value of each communication band assigned for each said transmission line according to the number of radio terminals that are performing communication in a cell managed by said radio base station.

5. The mobile communication system according to claim 1, wherein:
said multiplex transmission apparatus, when a value of communication band of said transmission line that was calculated by said core network unit exceeds a maximum value of the communication band that can be used by said radio base station, reports communication band excess to said core network unit; and
said core network unit, upon receiving notification of said communication band excess, if a radio terminal that can communicate with an adjacent cell exists in the cell managed by said radio base station, diverts a communication band to said transmission line of said radio base station that manages the adjacent cell to thus maintain the communication service communicate with the radio terminal.

6. The mobile communication system according to claim 1, wherein said core network unit includes:
a positional information database that registers positional information of each of said radio terminals;
a design information database in which is registered system design information that includes information of the maximum value of communication bands that can be used by said multiplex transmission apparatus and the number of said radio base stations that are connected to said multiplex transmission apparatus; and
a positional information processor that uses information registered in said design information database and said positional information database to calculate the value of each communication band that is assigned to said transmission lines.

7. A band control method comprising, based on positional information for each radio terminal, calculating the value of communication bands and assigning said communication bands that are necessary for each transmission line between a multiplex transmission apparatus that consolidates lines from a plurality of radio base stations and said radio base stations, and thus establishing communication between said radio base stations and said multiplex transmission apparatus according to the value of communication bands for each said radio base station that is calculated.

8. The band control method according to claim 7, wherein the value of a communication band that is assigned to each said radio base station is calculated according to the number of radio terminals in the cell managed by said radio base stations.

9. The band control method according to claim 7, wherein the value of a communication band that is assigned to each said transmission line is calculated according to the number of radio terminals having power supply ON in the cell managed by said radio base station.

10. The band control method according to claim 7, wherein the value of a communication band that is assigned to each said radio base station is calculated according to the number of radio terminals performing communication in the cell managed by said radio base station.

11. The band control method according to claim 7, further including steps of:
judging whether a calculated value of said communication band of said transmission line exceeds a maximum value of the communication bands that can be used in said radio base station; and
when the calculated value of said communication band of said transmission line exceeds the maximum value of communication bands that can be used by said radio base station, and if a radio terminal that can communicate with an adjacent cell exists in the cell managed by said radio base station, diverting a communication band to said transmission line of said radio base station that manages the adjacent cell to maintain communication service communicate with the radio terminal.

* * * * *